United States Patent
Fujimoto et al.

(10) Patent No.: US 12,001,793 B2
(45) Date of Patent: Jun. 4, 2024

(54) INTERACTION SERVER

(71) Applicant: NTT DOCOMO, INC., Chiyoda-ku (JP)

(72) Inventors: Hiroshi Fujimoto, Chiyoda-ku (JP); Takanori Hashimoto, Chiyoda-ku (JP); Yuriko Ozaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 899 days.

(21) Appl. No.: 17/042,605

(22) PCT Filed: Dec. 28, 2018

(86) PCT No.: PCT/JP2018/048580
§ 371 (c)(1),
(2) Date: Sep. 28, 2020

(87) PCT Pub. No.: WO2019/193796
PCT Pub. Date: Oct. 10, 2019

(65) Prior Publication Data
US 2021/0097236 A1 Apr. 1, 2021

(30) Foreign Application Priority Data
Apr. 3, 2018 (JP) .................................. 2018-071835

(51) Int. Cl.
*G06F 40/30* (2020.01)
*G06F 16/2455* (2019.01)
(Continued)

(52) U.S. Cl.
CPC ........ *G06F 40/279* (2020.01); *G06F 16/2455* (2019.01); *G06F 16/284* (2019.01); *G06F 40/30* (2020.01)

(58) Field of Classification Search
CPC ......... G06F 16/90332; G06F 16/90344; G06F 40/30; G06F 16/3329; G06F 16/3344;
(Continued)

(56) References Cited

U.S. PATENT DOCUMENTS 7,912,701 B1 * 3/2011 Gray ....................... G06F 40/30
704/7
2008/0235181 A1 * 9/2008 Faunce ............... G06F 16/2453
(Continued)

FOREIGN PATENT DOCUMENTS

JP 2002-222147 A 8/2002
JP 2015-36945 A 2/2015

OTHER PUBLICATIONS

International Preliminary Report on Patentability and Written Opinion dated Oct. 15, 2020 in PCT/JP2018/048580 (submitting English translation only), 9 pages.
(Continued)

*Primary Examiner* — Jakieda R Jackson
(74) *Attorney, Agent, or Firm* — Oblon, McClelland, Maier & Neustadt, L.L.P.

(57) ABSTRACT

An object is to provide an interaction server in which inputs of an input keyword are reduced and the number of exchanges in interaction is reduced as a result.
An interaction server 100 includes a truth table 104 configured to have question sentences including a sentence to be provided to a user and a plurality of searching keywords associated with, and a relational table 105 configured to have one main keyword and a plurality of related keywords related to the main keyword associated with each other. A search unit 102 acquires at least one of the one main keyword and any of the plurality of related keywords listed in the relational table 105 on the basis of an input keyword, further performs searching in the truth table 104 using the main keyword and/or the related keyword which has been
(Continued)

acquired, and acquires a question sentence candidate which is response content corresponding to the main keyword or the related keyword.

8 Claims, 8 Drawing Sheets

(51) Int. Cl.
*G06F 16/28* (2019.01)
*G06F 40/279* (2020.01)

(58) Field of Classification Search
CPC ...... G06F 16/334; G06F 40/279; G06F 40/35; G06F 16/2282; G06F 16/242; G06F 16/284; G06F 16/2455
See application file for complete search history.

(56) References Cited

U.S. PATENT DOCUMENTS

| | | | |
|---|---|---|---|
| 2016/0098451 A1* | 4/2016 | Dickie | G06F 16/2465 707/718 |
| 2016/0098477 A1* | 4/2016 | Berajawala | G06F 3/0482 707/727 |
| 2017/0068976 A1* | 3/2017 | Wawrzynowicz | H04M 3/5175 |
| 2018/0165723 A1* | 6/2018 | Wright | G06F 40/30 |
| 2018/0218374 A1* | 8/2018 | Shah | G06Q 30/016 |

OTHER PUBLICATIONS

International Search Report dated Apr. 2, 2019 in PCT/JP2018/048580 filed on Dec. 28, 2018, 2 pages.
Office Action dated Oct. 19, 2021 in corresponding Japanese Patent Application No. 2020-511598 (with English Translation), 8 pages.

* cited by examiner

Fig.2

|  | TERMINAL A | TERMINAL B | WIRELESS LAN | ... |
|---|---|---|---|---|
| SETTING OF WIRELESS LAN IN TERMINAL A | ○ |  | ○ | ... |
| SETTING OF WIRELESS LAN IN TERMINAL B |  | ○ | ○ | ... |
| ... | ... | ... | ... | ... |

*Fig.3*

|  | TERMINAL A | TERMINAL B | ... |
|---|---|---|---|
| TERMINAL | ○ | ○ | ... |
| ... | ... | ... | ... |

| | TERMINAL A | TERMINAL B | WIRELESS LAN | ... | RESPONSE |
|---|---|---|---|---|---|
| SETTING OF WIRELESS LAN IN TERMINAL A | ○ | | | ... | |
| | | ○ | ○ | ... | DESCRIPTION OF SETTING OF WIRELESS LAN |
| SETTING OF WIRELESS LAN IN TERMINAL B | | ○ | ○ | ... | DESCRIPTION OF SETTING OF WIRELESS LAN |
| ... | ... | ... | ... | ... | ... |

(b)

| | TERMINAL A | TERMINAL B | TERMINAL C |
|---|---|---|---|
| TERMINAL | ○ | ○ | ○ |

INTERACTION SERVER

TECHNICAL FIELD

The present invention relates to an interaction server performing searching on the basis of an input key.

BACKGROUND ART

The following Patent Literature 1 discloses controlling an output of a response to a question included in a natural sentence, avoiding a risk of selecting a response that does not match an intention of a question of a client, and a question-response control program for efficiently performing processing of narrowing responses. Specifically, in this Patent Literature 1, in a case in which a predetermined number of search results or more are obtained when FAQ searching is performed, the number thereof is narrowed by asking a counter-question or a related question.

CITATION LIST

Patent Literature

[Patent Literature 1] Japanese Unexamined Patent Publication No. 2015-36945

SUMMARY OF INVENTION

Technical Problem

In the technology described in Patent Literature 1, a keyword is extracted from a question which is composed of a natural sentence, and searching is performed on the basis of the keyword. In this Patent Literature 1, since AND searching is performed using an extracted keyword, there is a need to perform searching separately when keywords such as synonyms having a parallel relationship therebetween are searched for. For example, when Windows 7 (registered trademark) is taken as an input keyword, Windows 8 (registered trademark) is omitted from searching targets. Accordingly, when a user desires to search for Windows 8, there is a need to separately input Windows 8 as an input keyword. As a result, the number of exchanges in interaction increases.

Here, in order to resolve the problem described above, the present invention aims to provide an interaction server in which inputs of an input keyword are reduced and the number of exchanges in interaction is reduced as a result.

Solution to Problem

In order to resolve the problem described above, the present invention provides an interaction server responding to an input made by a user such that the user is urged to make an additional input and holding an interaction by providing response content according to the input of the user. The interaction server includes a truth table configured to have response content including a sentence to be provided to the user and a plurality of searching keywords associated with each other; a relational table configured to have a plurality of related keywords related to and associated with each other; a reception unit configured to receive an input of an input keyword from the user; a search unit configured to acquire a related keyword in the relational table on the basis of the input keyword, to perform searching in the truth table, and to acquire response content corresponding to the related keyword; and a transmission unit configured to transmit the response content to the user.

According to this invention, a plurality of related keywords can be simply designated and searching based on the designated keywords can be performed using a relational table. Accordingly, accuracy of searching can be improved, and the number of exchanges in interaction can be reduced.

Advantageous Effects of Invention

According to the present invention, accuracy of searching can be improved, and the number of exchanges in interaction can be reduced.

BRIEF DESCRIPTION OF DRAWINGS

FIG. 2 is a diagram showing a specific example of a truth table 104.

FIG. 3 is a diagram showing a specific example of a relational table 105.

FIG. 7 is a diagram showing a specific example of the truth table 104 and the relational table 105 for describing a certain case.

DESCRIPTION OF EMBODIMENT

An embodiment of the present disclosure will be described with reference to the accompanying diagrams. If possible, the same reference signs are applied to the same parts, and duplicate description will be omitted.

Figure 1:
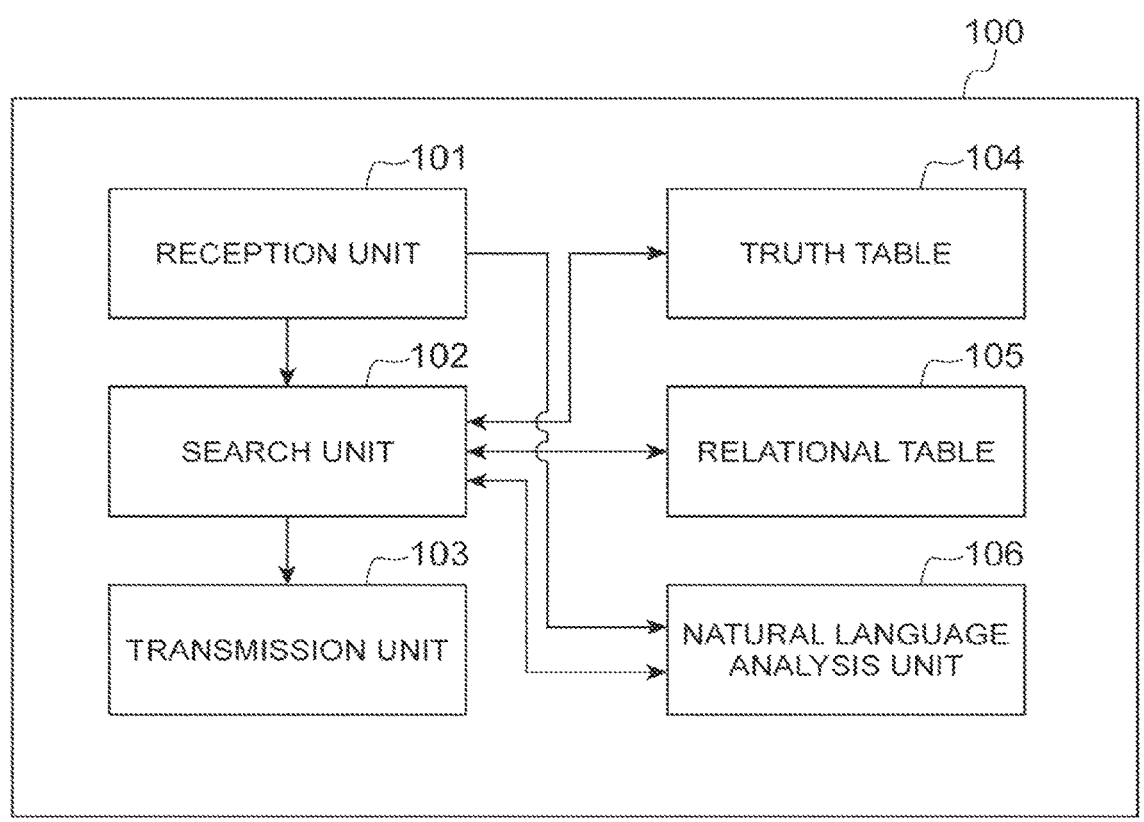
FIG. 1 is a block diagram showing a configuration of functions of an interaction server 100 according to the present embodiment.

FIG. 1 is a block diagram showing a configuration of functions of an interaction server 100 according to the embodiment of the present disclosure. This interaction server 100 is configured to include a reception unit 101, a search unit 102, a transmission unit 103, a truth table 104, a relational table 105, and a natural language analysis unit 106. This interaction server 100 provides response content (corresponding search result) to a user terminal (not shown in the diagrams) on the basis of an input keyword for performing search from the user terminal. At this time, the interaction server 100 receives the intention from the user terminal by using a return question key and proceeds with searching processing. The interaction server 100 is a server used in a so-called frequently asked question (FAQ) system and used for providing a corresponding question sentence and a response thereto to the user on the basis of a keyword input from the user. Hereinafter, detailed processing thereof will be described.

The reception unit 101 is a part for receiving an input keyword from a user terminal via a network. When the user inputs a sentence as an input keyword, the reception unit 101 may receive the sentence and may extract an input keyword from the sentence. In addition, when the reception unit 101 receives intention information of an affirmative intention with respect to the return question key (which will be described below), the return question key is adopted as an input keyword.

The search unit 102 is a part for performing searching processing with reference to the truth table 104 and the relational table 105 using an input keyword received by the reception unit 101. The processing will be described below.

The truth table 104 is a mapping table in which one or a plurality of keywords for performing searching and question sentences (response content) are associated with each other. FIG. 2 is a diagram showing a specific example of the truth table 104. In FIG. 2, in the truth table 104, one or a plurality of searching keywords are associated with the question sentence. For example, searching keywords "terminal A" and "wireless LAN" are associated with a question sentence such as "setting of wireless LAN in terminal A". This searching keyword is extracted in advance from a question sentence for a FAQ by a manager or through machine processing such as natural language processing and is generated as the truth table 104. In this truth table 104, responses (related content with respect to a question sentence) may be mapped. In addition, a FAQ table (not shown in the diagrams) may be prepared separately, and question sentences and responses listed therein may be mapped.

Figure 3:
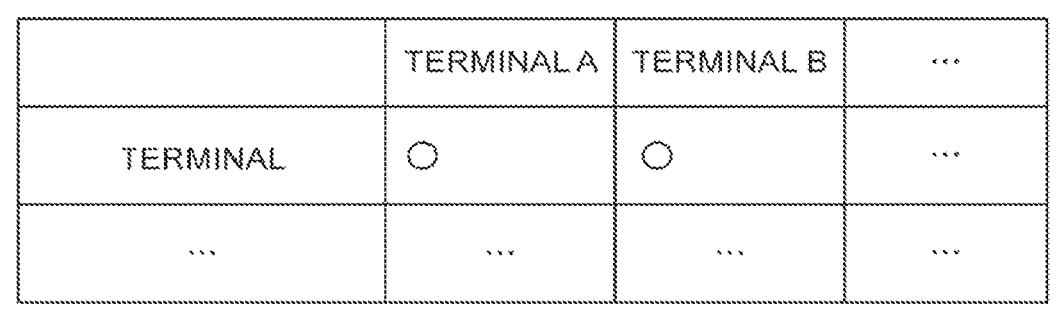

The relational table 105 is a mapping table in which one or a plurality of related keywords are associated with one main keyword. In the present embodiment, in the relational table 105, one or a plurality of subordinate keywords are associated with one superordinate keyword. FIG. 3 is a diagram showing a specific example of the relational table 105. In FIG. 3, "terminal" is listed as a superordinate keyword, and "terminal A", "terminal C", and the like are listed as subordinate keywords in association with each other. In FIG. 3, keywords having a superordinate/subordinate relationship are associated with each other, but the configuration is not limited thereto, and a manager of this system may cause keywords which the manager desires to be associated with each other to be associated regardless of the meanings thereof. In addition, in the present embodiment, one main keyword (superordinate keyword) is set. However, a mapping table listing related keywords related to each other may be adopted without particularly setting a main keyword. In this case, a main keyword may be regarded as one related keyword, and the main keyword may be included in keywords related to each other.

The natural language analysis unit 106 is a part for determining whether searching is performed with a meaning including any of related keywords associated with the input keyword or searching is performed with a meaning including none of the related keywords. More specifically, first, the natural language analysis unit 106 extracts an input keyword configuring an input sentence from the input sentence received from the reception unit 101. Further, the natural language analysis unit 106 determines whether searching is performed with a meaning including any of the related keywords associated with the input keyword or searching is performed with a meaning including none of the related keywords in the relational table 105.

For example, when "terminal cannot be connected to wireless LAN" is input as an input sentence, the natural language analysis unit 106 determines that the input sentence includes either "terminal A" or "terminal B" associated with "terminal". In this case, the search unit 102 performs searching including either keyword on the basis of the truth table 104.

In addition, when "want to know about radio communication method other than using terminal" is input as an input sentence, the natural language analysis unit 106 determines that the input sentence includes neither "terminal A" nor "terminal B" associated with "terminal". In this case, the search unit 102 searches for response content (question sentence) including none of the keywords.

Classification of affirmation and negation in this natural language analysis unit 106 can be realized using a classifier model established by a general machine learning algorithm. For example, approximately several tens to several hundreds of sentence examples are collected for affirmative sentences and negative sentences respectively and are learned by a machine learning algorithm such as SVM, and thus it is possible to establish a classifier model which stochastically classifies arbitrary input sentences into affirmative sentences or negative sentence.

The following is a specific case. In a case of a sentence example in which an input sentence is "terminal cannot be connected to wireless LAN", the natural language analysis unit 106 determines that "terminal" includes either keyword. Regarding an input sentence such as "recipe including no dairy product", the natural language analysis unit 106 determines that "dairy product" includes none of the keywords. In the case herein, the natural language analysis unit 106 determines that "wireless LAN", "connect", and "recipe" include any of the keywords in both input sentences. The foregoing case is an example, and searching including all or searching not including any of the keywords may be determined.

Figure 4:
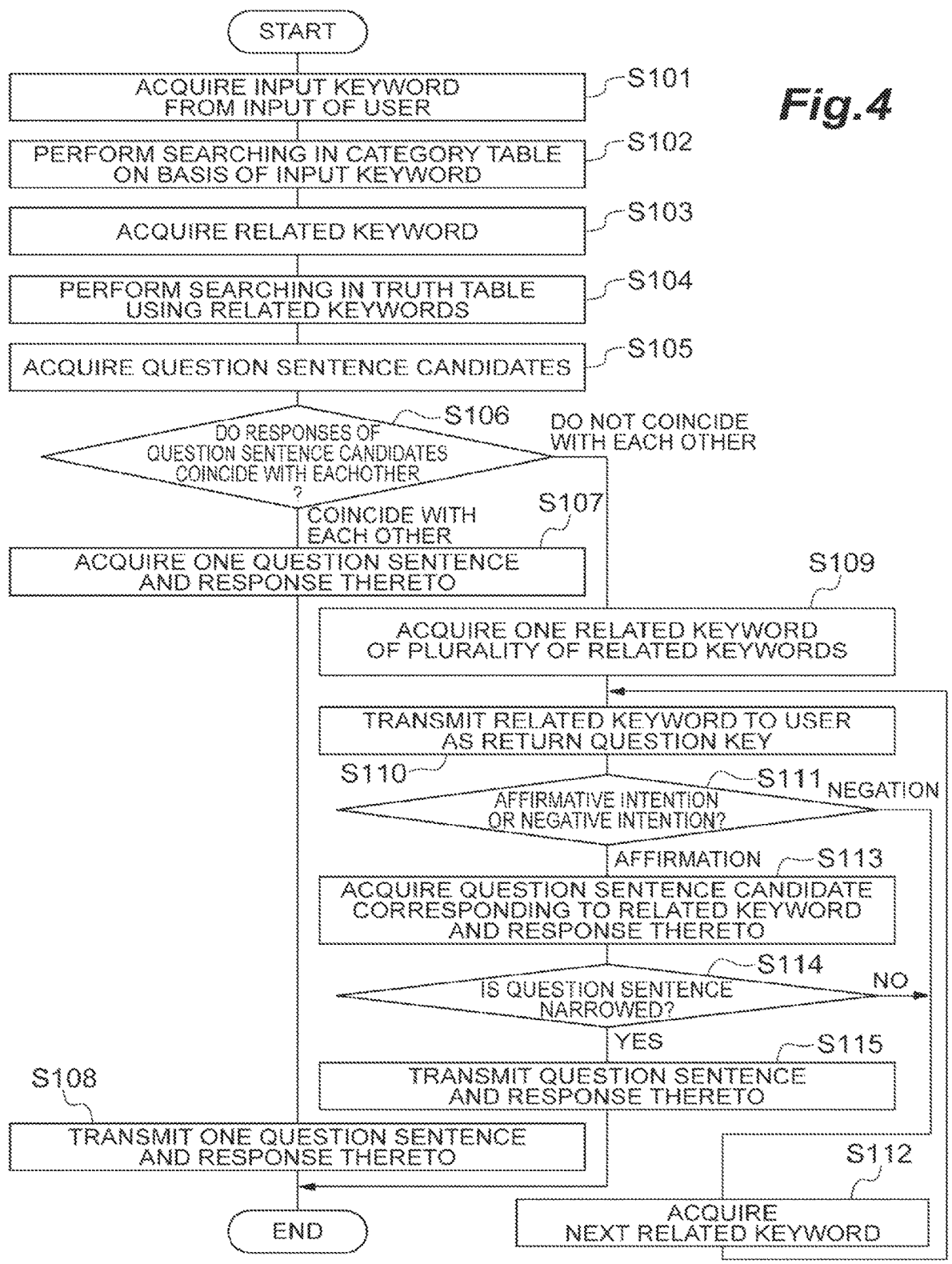
FIG. 4 is a flowchart showing operation of the interaction server 100.

Operation of the interaction server 100 having such a configuration will be described. FIG. 4 is a flowchart showing operation of the interaction server 100.

The reception unit 101 acquires an input keyword from an input sentence input from the user terminal or acquires an input keyword on the basis of intention information with respect to a return question key.

In addition, the natural language analysis unit 106 determines whether a related keyword corresponding to each of the input keywords includes any of the keywords or includes none of the keywords on the basis of an input sentence (S101). Processing of the natural language analysis unit 106 is not limited to the timing in Step S101 and may be determined in accordance with the processing of searching. As analysis results thereof, the natural language analysis unit 106 applies flag information indicating an and-searching target or an or-searching target to each one of the input keywords and temporarily stores the applied information. At the time of searching processing, the search unit 102 performs searching processing using the information.

The search unit 102 performs searching in the truth table 104 on the basis of an acquired input keyword and acquires a question sentence and a response thereto. More specifically, the processing is as follows.

The search unit 102 performs searching in the relational table 105 on the basis of an input keyword (S102). Further, the search unit 102 acquires a related keyword which coincides with the input keyword and acquires a different related keyword associated with the related keyword. The search unit 102 acquires one or a plurality of related keywords corresponding to each of the input keywords (S103). When an input keyword is not registered in the relational table 105, the search unit 102 handles the input keyword as a related keyword.

Moreover, the search unit 102 performs searching in the truth table 104 using one or a plurality of related keywords which have been acquired (S104) and acquires one or a plurality of pieces of response content (here, question sentence candidates) corresponding to the related keyword (S105). During searching in S104, searching according to the analysis results of the natural language analysis unit 106 is performed. That is, the search unit 102 performs searching including any of the keywords or searching not including any of the keywords using a plurality of related keywords acquired with respect to each one of the input keywords.

When a plurality of question sentence candidates are acquired, the search unit 102 determines whether or not responses corresponding to the question sentence candidates coincide with each other (S106). Here, if it is determined that the responses coincide with each other (S106: YES), the search unit 102 acquires any question sentence candidate of the plurality of question sentence candidates and the response thereto from the truth table 104 (S107). When the plurality of question sentence candidates are narrowed to one question sentence candidate, the one question sentence candidate and the response thereto are acquired from the truth table 104.

The transmission unit 103 transmits the one question sentence candidate and the response thereto, which have been acquired, to the user terminal (S108).

On the other hand, in a case in which a plurality of question sentence candidates are acquired in S106, when responses corresponding to the question sentence candidates do not coincide with each other, the search unit 102 acquires one related keyword of the plurality of related keywords (S109). The one related keyword to be acquired is determined by the order of priority set in advance. For example, a standard based on the input frequency of the input keyword, the listing frequency in the truth table 104, and the like is conceivable, but the configuration is not limited thereto.

The search unit 102 delivers the one related keyword which has been acquired to the transmission unit 103, and the transmission unit 103 transmits the one related keyword to the user terminal as a return question key (S110).

The reception unit 101 receives an intention with respect to the return question key, and the search unit 102 determines whether the intention is an affirmative intention or a negative intention (S111). When a response to the return question key has a negative intention, the search unit 102 acquires a related keyword next in order, and the transmission unit 103 transmits the related keyword as a return question key (S112 and S110).

When a response to the return question key has an affirmative intention, the search unit 102 acquires a question sentence candidate corresponding thereto and a response thereto (S113). When the search unit 102 determines that the number of question sentence candidates and the responses thereto are equal to or fewer than a predetermined number (S114: YES), the transmission unit 103 transmits the question sentence candidate as a question sentence together with the response (S115).

In addition, when the number of question sentence candidates and the responses thereto are not equal to or fewer than the predetermined number (S114: NO), the search unit 102 acquires a related keyword next in order and transmits the related keyword as a return question key (S112 and S110).

In accordance with this processing, the interaction server 100 performs searching processing on the basis of the related keyword related to the input keyword.

Here, the foregoing processing in Step S106 will be described specifically. In the FAQ system, responses may be the same or may vary for each of the question sentences. For example, a method for setting a wireless LAN of the terminal A and a method for setting a wireless LAN of the terminal B may be the same. On the other hand, setting of a wireless LAN may vary between the terminal A and the terminal C. A case of the same indicates a case in which link destinations of the responses are the same or the sentences themselves are the same. The search unit 102 can determine the identity thereof.

Figure 5:
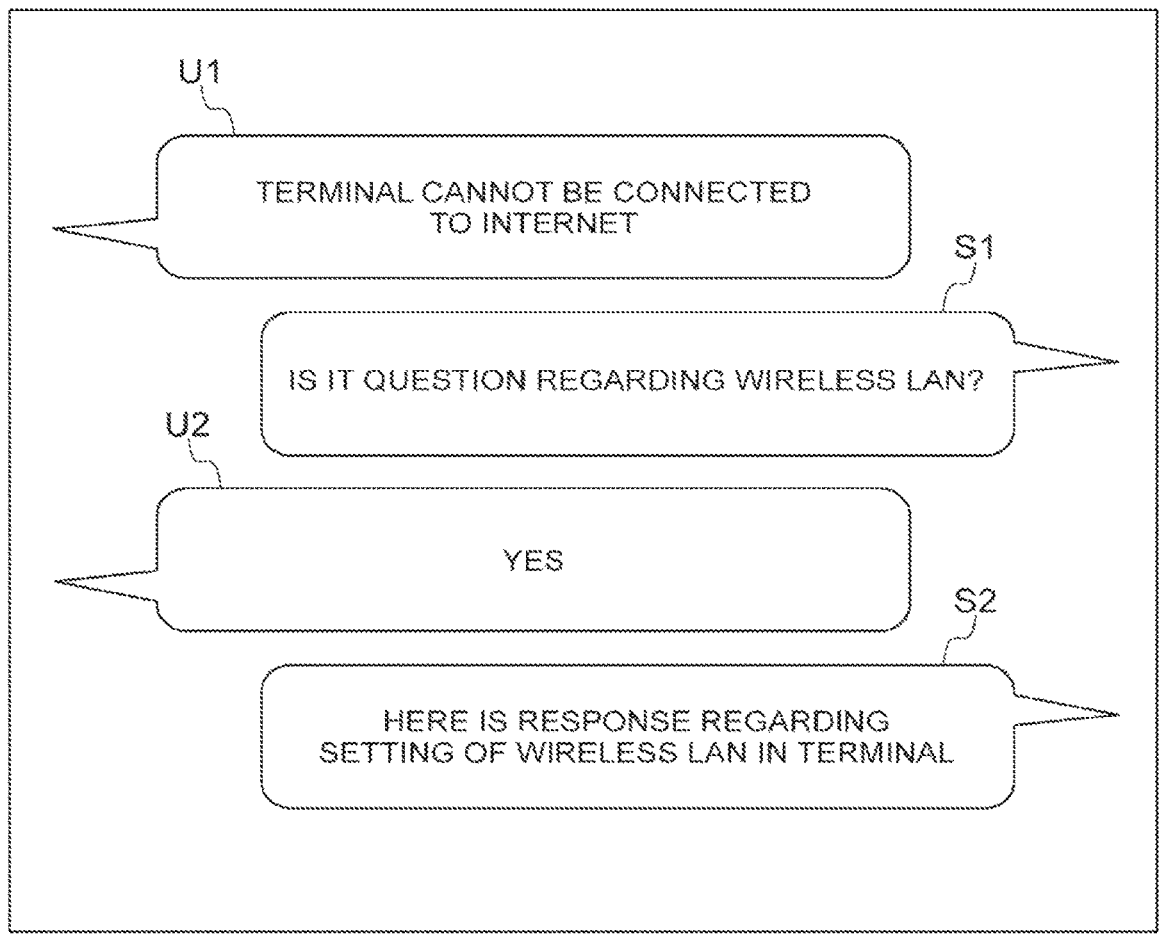
FIG. 5 is a diagram showing interaction processing in a case in which responses to searched question sentences are the same.
Figure 6:
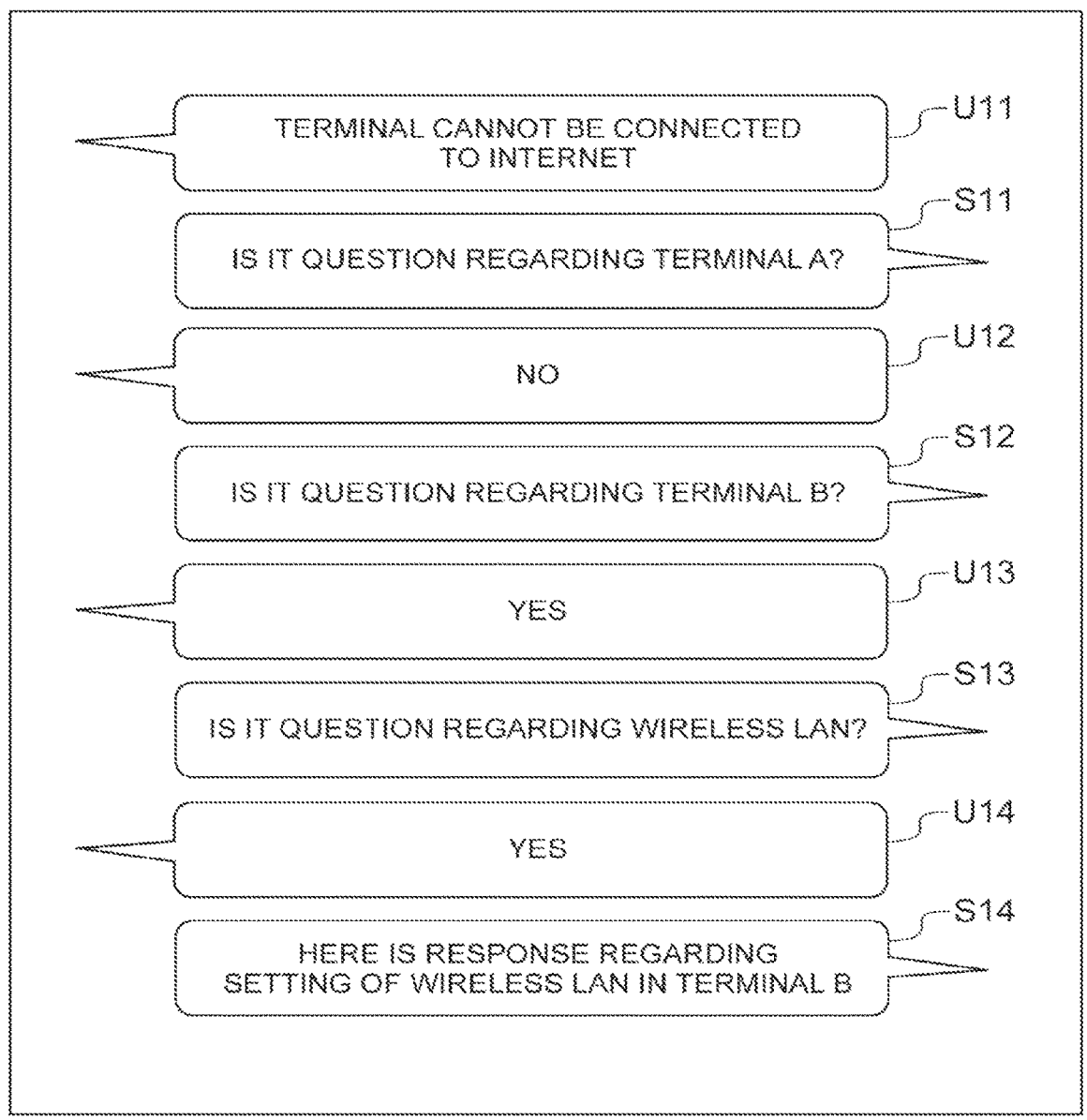
FIG. 6 is a diagram showing an example of a screen showing interaction processing in a case in which a response varies depending on a question sentence.

Using FIGS. 5 and 6, a difference between interaction screens when responses are the same and when responses vary will be described. FIG. 5 shows an interaction screen of a user terminal when responses to the searched question sentences are the same. As shown in FIG. 5, a speech bubble U1 is an input sentence input by the user. Here, "terminal cannot be connected to the Internet" is input as an input sentence.

When this input sentence is received, the interaction server 100 extracts the input keyword. Here, "terminal", "Internet", and "cannot be connected" are extracted. The search unit 102 extracts a question sentence or a return question key (response content) using these keywords as searching keywords with reference to the truth table 104. In FIG. 5 described above, "terminal" is input. However, as described above, "terminal" is a main keyword, and a related keyword related thereto is extracted from the relational table. Although it is not displayed in the screen of FIG. 5, the interaction server 100 extracts "terminal A" and "terminal B" as related keywords, and searching processing based thereon is performed.

In FIG. 5, since the method for setting a wireless LAN of "terminal A" and that of "terminal B" are the same, processing for a next keyword is performed without asking a return question whether the terminal is the terminal A or the terminal B.

In the example of FIG. 5, the search unit 102 extracts "wireless LAN" as a return question key, and the transmission unit 103 transmits "wireless LAN" to the user terminal. In the user terminal, a speech bubble S1 is displayed.

The user expresses an affirmative intention therefor (speech bubble U2), and the interaction server 100 responds to "regarding setting of wireless LAN of terminal" (speech bubble S2).

On the other hand, when responses vary depending on question sentences, there is a need to perform return question processing separately. FIG. 6 is a diagram showing an example of a screen showing interaction processing thereof.

When the user inputs "terminal cannot be connected to the Internet" (speech bubble U11), the interaction server 100 extracts "terminal", "Internet", and "cannot be connected" as input keywords and performs searching processing with reference to the truth table 104. In this example, in the truth table 104, it is assumed that a response regarding setting of a wireless LAN is set to each of "terminal A" and "terminal B".

The interaction server 100 performs return question processing with respect to the user to check whether the terminal is "terminal A" or "terminal B" (speech bubbles S11 and S12).

In the present embodiment, since the user expresses a negative intention for "terminal A" (speech bubble U12) and expresses an affirmative intention for "terminal B" (speech bubble U13), searching including "terminal B" is performed. In FIG. 6, subsequently, searching processing is performed by asking a return question regarding "wireless LAN".

As it is apparent from the foregoing description, when responses are the same even if searched question sentences vary, a return question is not asked with respect to each of "terminal A" and "terminal B". Accordingly, a processing load on the interaction server 100 can be reduced by omitting processing thereof. That is, it is possible to contribute to the efficiency of memory resources and reduction of traffic.

Next, processing in a case in which a keyword which is listed in the relational table 105 but is not listed in the truth table 104 is input will be described. FIG. 7 is a diagram showing a specific example of the truth table 104 and the relational table 105.

FIG. 7(*b*) is a diagram showing a specific example of the relational table 105. Herein, "terminal C" which is not listed in the truth table 104 is listed as a related keyword.

For example, when the user inputs an input sentence including "terminal C", and when the interaction server 100 acquires "terminal C" as a keyword, "terminal C" is not listed in the truth table 104. Therefore, a search result cannot be acquired through searching processing using only the truth table 104.

In the present embodiment, with reference to the relational table 105 having "terminal C" as a key, the search unit 102 in the interaction server 100 acquires the related keywords "terminal A" and "terminal B" including the main keyword "terminal". Further, searching processing is performed with reference to the truth table 104 using both the related keywords "terminal A" and "terminal B". That is, the search unit 102 extracts the question sentence corresponding to each of the related keywords "terminal A" and "terminal B" and the response thereto, and the transmission unit 103 transmits the question sentences and the responses to the user terminal.

According to this description, even when the input keyword is not listed in the truth table 104, the interaction server 100 can provide question sentences and responses close to at least those the user desires using the related keyword.

Next, operational effects of the interaction server 100 according to the embodiment of the present disclosure will be described. The interaction server 100 is an interaction server holding an interaction by responding to an input made by a user such that the user is urged to make an additional input and by providing response content according to the input of the user. For example, this interaction server 100 is a server used in a FAQ system. The interaction server 100 is a server performing return question processing, in which a return question key for urging the user to make an additional input is transmitted or the like, when an input keyword is extracted from a question sentence input from the user, searching is performed on the basis of the input keyword, and the number of search results is not equal to or fewer than a predetermined number such that the question sentence intended by the user cannot be narrowed sufficiently.

This interaction server 100 includes the truth table 104 associating question sentences (response content) including a sentence to be provided to the user with a plurality of searching keywords, and the relational table 105 associating one main keyword with a plurality of related keywords related to the main keyword.

Further, when the reception unit 101 receives a result by extracting an input of the input keyword from the input sentence input from the user, the search unit 102 acquires at least one of the one main keyword and any of the plurality of related keywords listed in the relational table 105 on the basis of the input keyword. Then, the search unit 102 further performs searching in the truth table 104 using the main keyword and/or the related keyword which has been acquired, and acquires a question sentence candidate which is response content corresponding to the main keyword or the related keyword. In the present embodiment, the response content is regarded as a question sentence candidate intended by the user, but the configuration is not limited thereto. Any content can be used as long as it is response content regarding searching.

The transmission unit 103 transmits the question sentence candidate to the user. When narrowing cannot be performed sufficiently, for example, the number of question sentence candidates is equal to or fewer than a predetermined value and the like, the search unit 102 extracts a return question key for urging the user to make an additional input from the truth table 104 and transmits the return question key to the user.

According to this configuration, the interaction server 100 can simply designate a plurality of related keywords and can perform searching based thereon using the relational table 105. Accordingly, the accuracy of searching can be improved, and the number of exchanges in interaction can be reduced. When the number of exchanges in interaction can be reduced, this leads to reduction of a processing load on the interaction server 100 and the user terminal. In addition, since no extra interactions are stored, this leads to efficient use of the memory resources. Moreover, when the interaction server 100 and the user terminal can be accessible to each other via a public network, communication traffic thereof is reduced.

As described above, in the relational table 105, a main keyword and related keywords may be registered as the related keywords related to each other without being distinguished from each other, and the search unit 102 may take out a related keyword corresponding to an input keyword and may perform searching with respect to the truth table 104.

In addition, the relational table 105 is a table for complementing the truth table 104 and can simply perform complementing of keywords without reconstituting the truth table 104. Accordingly, the accuracy of searching processing can be maintained simply.

In addition, the truth table 104 in the interaction server 100 further associates responses which are related content regarding the question sentence. The search unit 102 performs searching in the truth table 104 using a plurality of related keywords related to the main keyword or a plurality of different related keywords related to one related keyword. When responses mapped to a plurality of searched question sentence candidates are the same, the search unit 102 acquires a question sentence candidate corresponding to at least one related keyword, and the transmission unit 103 transmits the question sentence candidate. There is a plurality of question sentence candidates (response content), therefore it is preferable that all of the question sentence candidates be transmitted to the user. However, any arbitrary question sentence candidate or one question sentence candidate determined in accordance with a predetermined order of priority (having a high provision frequency or the like) may be transmitted.

Even if the main keyword or the related keyword varies and the question sentences are different from each other, the retrieved content (response) may be the same. For example, an operation method (response thereto) may be the same while having "teach me method for operating terminal A" and "teach me method for operating terminal B" as response content. In such a case, the number of exchanges in interaction can be reduced by transmitting any question sentence candidate (or all of the question sentence candidates).

In addition, in the interaction server 100, the search unit 102 performs searching in the truth table 104 using a plurality of related keywords related to the main keyword or a plurality of different related keywords related to one related keyword. When responses mapped to a plurality of searched question sentence candidates are different from each other, one related keyword of the plurality of related keywords is acquired as a return question key. Further, the transmission unit 103 transmits the one related keyword as a return question key for urging the user to make an additional input. In this case, the return question key corresponds to the response content.

According to this configuration, return question processing is performed using one related keyword in order to narrow the responses. Consequently, the user can be introduced to the question sentence candidates and the responses intended by the user.

In addition, in the interaction server 100, the reception unit 101 acquires an input keyword on the basis of the input sentence received from the user and acquires a plurality of related keywords using the input keyword. The search unit 102 determines whether searching including any of the plurality of related keywords is performed or searching including none of the plurality of related keywords is performed in accordance with the analysis results of natural language analysis processing of the input sentence.

According to this configuration, it is possible to switch between searching including any of the related keywords of the input keyword and searching including none of the related keywords in accordance with the analysis results of the natural language processing. Thus, searching intended by the user can be performed, and the number of exchanges in interaction can be reduced.

In addition, in the interaction server 100, when the input keyword coincides with only the related keyword in the relational table, the search unit 102 acquires response content corresponding to a different related keyword associated with the related keyword from the truth table.

According to this configuration, when there is a keyword which coincides with the input keyword in only the relational table 105 but not in the truth table 104, suitable response content can be provided to the user using this. Thus, the number of exchanges in interaction can be reduced.

The block diagrams used in description of the foregoing embodiment indicate blocks in units of function. The functional blocks (configuration units) are realized in an arbitrary combination of hardware and/or software. In addition, means for realizing each of the functional blocks is not particularly limited. That is, each of the functional blocks may be realized by one device which is physically and/or logically coupled and may be realized by two or more devices which are physically and/or logically separated from each other by connecting the plurality of devices to each other directly and/or indirectly (for example, through a cable and/or by radio).

Figure 8:
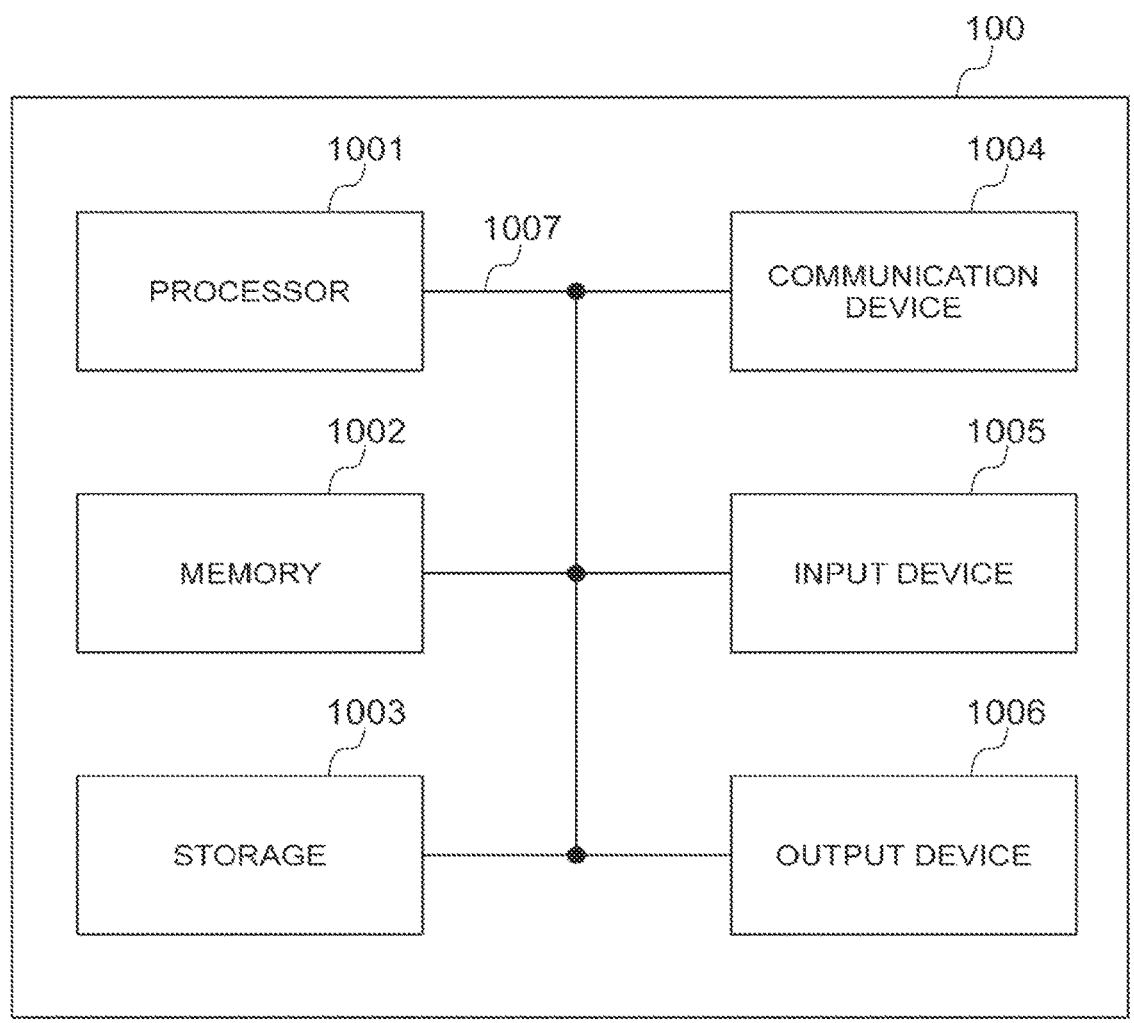
FIG. 8 is a diagram showing a hardware configuration of the interaction server 100.

For example, the interaction server 100, the user terminal, and the like according to the embodiment of the present invention may function as a computer performing processing of the interaction server 100 of the present embodiment. FIG. 8 is a diagram showing an example of a hardware configuration of the interaction server 100 according to the present embodiment. The interaction server 100 described above may be physically configured as a computer device including a processor 1001, a memory 1002, a storage 1003, a communication device 1004, an input device 1005, an output device 1006, a bus 1007, and the like.

In the following description, the wording "device" can be reworded as a circuit, a device, a unit, or the like. The hardware configuration of the interaction server 100 may be configured to include one or a plurality of devices shown in the diagrams or may be configured without including some devices.

Each of the functions in the interaction server 100 is realized by causing predetermined software (program) to be read in hardware such as the processor 1001 or the memory 1002 such that the processor 1001 performs arithmetic operation, and by controlling communication using the communication device 1004 and reading and/or writing of data in the memory 1002 and the storage 1003.

For example, the processor 1001 controls the computer in its entirety by operating an operating system. The processor 1001 may be configured as a central processing unit (CPU) including an interface for peripheral devices, a controller, an arithmetic unit, a register, and the like. For example, the search unit 102 and the like may be realized by the processor 1001.

In addition, the processor 1001 reads a program (program code), a software module, and data from the storage 1003 and/or the communication device 1004 into the memory 1002 and executes various kinds of processing in accordance therewith. Regarding the program, a program causing the computer to execute at least a part of the operation described in the foregoing embodiment is used. For example, the search unit 102 of the interaction server 100 may be realized by a control program which is stored in the memory 1002 and operates in the processor 1001, and other functional blocks may also be realized similarly. A case in which various kinds of processing described above are executed by one processor 1001 has been described, but they may be executed simultaneously or sequentially by two or more processors 1001. The processor 1001 may be mounted in one or more chips. The program may be transmitted from a network via an electric communication circuit.

The memory 1002 is a computer-readable recording medium. For example, it may be configured to be at least one of a read only memory (ROM), an erasable programmable ROM (EPROM), an electrically erasable programmable ROM (EEPROM), a random access memory (RANI), and the like. The memory 1002 may be referred to as a register, a cache, a main memory (main storage device), or the like. The memory 1002 can retain a program (program code), a software module, and the like which can be executed to perform a radio communication method according to the embodiment of the present invention.

The storage 1003 is a computer-readable recording medium. For example, it may be configured to be at least one of an optical disc such as a compact disc ROM (CD-ROM), a hard disk drive, a flexible disk, a magneto-optical disc (for example, a compact disc, a digital versatile disc, a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. For example, the storage medium described above may be a table including the memory 1002 and/or the storage 1003, a server, or other suitable mediums.

The communication device 1004 is hardware (transceiver device) for performing communication between computers through a cable and/or via a radio network. For example, it is also referred to as a network device, a network controller, a network card, a communication module, or the like. For example, the reception unit 101, the transmission unit 103, and the like described above may be realized by the communication device 1004.

The input device 1005 is an input device (for example, a keyboard, a mouse, a microphone, a switch, a button, or a sensor) receiving an input from the outside. The output device 1006 is an output device (for example, a display, a speaker, or an LED lamp) performing an output to the outside. The input device 1005 and the output device 1006 may be configured to be an integrated body (for example, a touch panel).

In addition, the devices, such as the processor 1001 and the memory 1002, are connected to each other using the bus 1007 for communication of information. The bus 1007 may be configured to be a single bus or may be configured to be separate buses between devices.

In addition, the interaction server 100 may be configured to include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be mounted in at least one of the units of hardware.

Hereinabove, the present embodiment has been described in detail, and it is apparent to those skilled in the art that the present embodiment is not limited to the embodiment described in this specification. The present embodiment can be performed in modified and altered forms without departing from the gist and the scope of the present invention defined by description in the claims. Accordingly, this specification has been described for the purpose of exemplary explanation and does not have any restrictive meaning for the present embodiment.

The aspects/embodiment described in this specification may be applied to systems utilizing Long Term Evolution (LTE), LTE-Advanced (LTE-A), SUPER 3G, IMT-Advanced, 4G, 5G, future radio access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-wideband (UWB), Bluetooth (registered trademark), or other suitable systems and/or next-generation systems which are extended on the basis thereof.

The order of processing procedures, the sequences, the flowcharts, and the like of the aspects/embodiment described in this specification may be switched as long as there is no inconsistency. For example, in the methods described in this specification, elements of various steps are presented in an exemplary order, and the methods are not limited to any particular orders which have been presented.

The input and output information or the like may be retained in a particular place (for example, a memory) or may be managed using a management table. The input and output information or the like may be overwritten, updated, or added. The output information or the like may be deleted. The input information or the like may be transmitted to a different device.

Judging may be performed using a value (0 or 1) which is expressed in one bit, may be performed using a Boolean value (true or false), or may be performed through comparison of numerical values (for example, comparison with the predetermined value).

The aspects/embodiment described in this specification may be used alone, may be used in combination, or may be switched upon execution thereof. In addition, notification of predetermined information (for example, notification of "being X") is not limited to explicit notification and may be performed through implicit notification (for example, the predetermined information is not notified).

Regardless of whether it is called software, firmware, middleware, micro-codes, hardware description language, or other names, software should be widely interpreted such that it means instructions, an instruction set, codes, code segments, program codes, a program, a sub program, a software module, an application, a software application, a software package, a routine, a subroutine, an object, an executable file, an execution thread, a procedure, a function, or the like.

In addition, software, instructions, and the like may be transceived via a transmission medium. For example, when software is transmitted from a website, a server, or a different remote resource using a wired technology such as a coaxial cable, an optical fiber cable, a twisted-pair wire, or a digital subscriber line (DSL) and/or a wireless technology such as infrared rays, radio waves, or microwaves, the wired technology and/or the wireless technology are included in the definition of the transmission medium.

Information, signals, and the like described in this specification may be expressed using any of various different technologies. For example, data, an instruction, a command, information, a signal, a bit, a symbol, and a chip which can be mentioned throughout the foregoing description in its entirety may be expressed by a voltage, a current, electromagnetic waves, a magnetic field or magnetic particles, a photo field or photons, or an arbitrary combination thereof.

The terms described in this specification and/or the terms required to understand this specification may be substituted with terms having the same or similar meanings.

The terms "system" and "network" are used compatibly in this specification.

Information, parameters, and the like described in this specification may be expressed by absolute values, may be expressed by values relative to predetermined values, or may be expressed by other corresponding information. For example, radio resources may be indicated by indices.

There are cases in which a user terminal or a mobile communication terminal is referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by those skilled in the art.

There are cases in which the term "determination" or "determining" used in this specification includes various kinds of operations. For example, the term "determination" or "determining" may include cases in which judging, calculating, computing, processing, deriving, investigating, looking up (for example, looking up in a table, a table, or another data structure), and ascertaining are regarded as "determination" or "determining". In addition, the term "determination" or "determining" may include cases in which receiving (for example, receiving information), transmitting (for example, transmitting information), inputting, outputting, and accessing (for example, accessing data in a memory) are regarded as "determination" or "determining". In addition, the term "determination" or "determining" may include cases in which resolving, selecting, choosing, establishing, and comparing are regarded as "determination" or "determining". That is, the term "determination" or "determining" may include cases in which a certain operation is regarded as "determination" or "determining".

The term "connected", "coupled", or all sorts of modifications thereof mean all sorts of direct or indirect connection or coupling between two or more elements and can include cases in which one or more intermediate elements are present between two elements which are "connected" or "coupled" to each other. Coupling or connection between elements may be conducted physically, logically, or in a combination thereof. When the term is used in this specification, it is conceivable that two elements be "connected" or "coupled" to each other by using one or more electric wires, cables, and/or an electrically printed connection, and by using electromagnetic energy such as electromagnetic energy having wavelengths of a radio frequency region, a microwave region, and a light (both visible and invisible) region as some non-limited and non-comprehensive examples.

The expression "on the basis of" used in this specification does not mean "on the basis of only" unless otherwise specified. In other words, the expression "on the basis of" means both "on the basis of only" and "on the basis of at least".

Any reference to elements having names such as "first" and "second" which are used in this specification does not generally limit amounts or an order of the elements. The terms can be conveniently used to distinguish two or more elements in this specification. Accordingly, reference to first and second elements does not mean that only two elements are employed or that the first element has to precede the second element in any form.

When the terms "include," "including," and modifications thereof are used in this specification or the appended claims, the terms are intended to have a comprehensive meaning similar to the term "comprising". The term "or" which is used in this specification or the claims is not intended to mean an exclusive logical sum.

In this specification, a singular term includes plural forms unless only one is mentioned to be apparent in context or technically.

REFERENCE SIGNS LIST

100 Interaction server
101 Reception unit
102 Search unit
103 Transmission unit
104 Truth table
105 Relational table
106 Natural language analysis unit

The invention claimed is:

1. An interaction server that holds an interaction by responding to an input made by a user such that the user is urged to make an additional input and by providing response content according to the input of the user, the interaction server comprising:
processing circuitry; and
a memory configured to store
 a truth table that associates response content including a sentence to be provided to the user with a plurality of searching keywords, and
 a relational table that includes a plurality of related keywords associated with each other;
wherein the processing circuitry
 receives an input of an input keyword from the user,
 automatically refers to the relational table and acquires a related keyword of a word that matches the input keyword, from the relational table,
 performs searching in the truth table, and acquires response content corresponding to the related keyword, and
 transmits the response content to the user,
wherein the processing circuitry acquires the input keyword on the basis of an input sentence received from the user,
wherein the processing circuitry is configured to make a determination to perform searching based on determining whether searching including any of the plurality of related keywords or searching including none of the plurality of related keywords by performing natural language analysis on the input sentence, the natural language analysis being trained via machine learning based on sentence examples of affirmative sentences and negative sentences.

2. The interaction server according to claim 1,
wherein the truth table further associates related contents related to the response contents,
wherein when a plurality of response contents are acquired, in a case in which related contents mapped to the plurality of acquired response contents are the same, the processing circuitry acquires response content corresponding to at least one related keyword, and
wherein the processing circuitry transmits the response content.

3. The interaction server according to claim 2,
wherein when a plurality of response contents are acquired, in a case in which related contents mapped to the plurality of acquired response contents are different, the processing circuitry acquires one related keyword of the plurality of related keywords, and
wherein the processing circuitry transmits the one related keyword as a return question key for urging the user to make an additional input.

4. The interaction server according to claim 1,
wherein when the input keyword does not coincide with any searching keyword in the truth table and coincides with a related keyword in the relational table, the processing circuitry acquires response content corresponding to a different related keyword associated with the related keyword in the relational table from the truth table.

5. The interaction server according to claim 1,
wherein the relational table causes one main keyword to be associated with the plurality of related keywords related to each other.

6. The interaction server according to claim 2,
wherein the processing circuitry acquires the input keyword on the basis of an input sentence received from the user,
wherein the processing circuitry is configured to perform searching based on determining determine whether searching including any of the plurality of related keywords is performed or searching including none of the plurality of related keywords is performed by analyzing the input sentence.

7. The interaction server according to claim 3,
wherein the processing circuitry acquires the input keyword on the basis of an input sentence received from the user,
wherein the processing circuitry is configured to perform searching based on determining determine whether searching including any of the plurality of related keywords is performed or searching including none of the plurality of related keywords is performed by analyzing the input sentence.

8. A method, implemented by an interaction server that holds an interaction by responding to an input made by a user such that the user is urged to make an additional input and by providing response content according to the input of the user, the method comprising:
- storing, in a memory, a truth table that associates response content including a sentence to be provided to the user with a plurality of searching keywords, and
- storing, in the memory, a relational table that includes a plurality of related keywords associated with each other;
- performing, by processing circuitry,
  - receiving an input of an input keyword from the user;
  - automatically referring to the relational table and acquires a related keyword of a word that matches the input keyword, from the relational table
  - performing searching in the truth table, and acquiring response content corresponding to the related keyword; and
  - transmitting the response content to the user,
- wherein the method further includes acquiring the input keyword on the basis of an input sentence received from the user, and
- making a determination to perform searching based on determining whether searching including any of the plurality of related keywords or searching including none of the plurality of related keywords by performing natural language analysis on the input sentence, the natural language analysis being trained via machine learning based on sentence examples of affirmative sentences and negative sentences.

* * * * *